(12) United States Patent
Lindinger

(10) Patent No.: US 11,772,764 B2
(45) Date of Patent: Oct. 3, 2023

(54) SHIP HULL HAVING A RAISED PORTION IN THE REGION OF AN UNDERSIDE OF THE SHIP HULL

(71) Applicant: LR-SHIPDESIGN AG, Baar (CH)

(72) Inventor: Roland Lindinger, Kanton Aargau (CH)

(73) Assignee: LR-SHIPDESIGN AG, Baar (CH)

( * ) Notice: Subject to any disclaimer, the term of this patent is extended or adjusted under 35 U.S.C. 154(b) by 283 days.

(21) Appl. No.: 17/271,075

(22) PCT Filed: Sep. 2, 2019

(86) PCT No.: PCT/EP2019/073374
§ 371 (c)(1),
(2) Date: Feb. 24, 2021

(87) PCT Pub. No.: WO2020/048933
PCT Pub. Date: Mar. 12, 2020

(65) Prior Publication Data
US 2021/0253207 A1 Aug. 19, 2021

(30) Foreign Application Priority Data
Sep. 3, 2018 (DE) .................... 10 2018 121 414.6

(51) Int. Cl.
*B63H 5/16* (2006.01)
*B63B 1/04* (2006.01)
*B63B 3/46* (2006.01)
(52) U.S. Cl.
CPC ............... *B63H 5/16* (2013.01); *B63B 1/042* (2013.01); *B63B 3/46* (2013.01)

(58) Field of Classification Search
CPC .. B63H 5/16; B63H 5/08; B63B 1/042; B63B 3/46; B63B 1/08; Y02T 70/10
USPC ....................................................... 114/61.29
See application file for complete search history.

(56) References Cited

U.S. PATENT DOCUMENTS

| | | | |
|---|---|---|---|
| 1,599,312 | A | 12/1921 | Zu et al. |
| 2,729,182 | A | 1/1956 | Tommasi |
| 4,550,673 | A | 11/1985 | Ingvason |
| 6,672,234 | B2 | 1/2004 | Osmundsvaag |

(Continued)

FOREIGN PATENT DOCUMENTS

| | | |
|---|---|---|
| DE | 10 2010 036 069 A1 | 3/2012 |
| EP | 1 203 715 A2 | 5/2002 |

(Continued)

OTHER PUBLICATIONS

European Office Action issued in corresponding European Patent Application No. 19 762 384.6 dated Sep. 7, 2022.

(Continued)

*Primary Examiner* — Anthony D Wiest
(74) *Attorney, Agent, or Firm* — MEDLER FERRO WOODHOUSE & MILLS PLLC

(57) ABSTRACT

The present invention relates to a hull in particular for a container ship, a bulk carrier and a tanker. The hull includes an elevation of an outer contour of the hull with respect to an upwards directed vertical direction of the hull in the region of a first body plan and a second body plan in relation to a surface section immediately adjoining to the elevation. Therein, the elevation is arranged in a region between a middle and a stern of the hull.

18 Claims, 9 Drawing Sheets

(56) References Cited

U.S. PATENT DOCUMENTS

2009/0320731 A1* 12/2009 Takashima ................ B63B 1/08
    114/57
2010/0000455 A1*  1/2010 Harper ..................... B63B 1/08
    114/61.29
2014/0083346 A1   3/2014 Viviani et al.

FOREIGN PATENT DOCUMENTS

| JP | S60-57498 U | 4/1985 |
| KR | 10-2004-0083543 A | 10/2004 |
| KR | 10-2010-0006354 U | 6/2010 |

OTHER PUBLICATIONS

Korean Office Action issued in corresponding Korean Patent Application No. 10-2021-7009023 dated Aug. 18, 2022.
Translation of International Search Report dated Nov. 7, 2019 in corresponding International Application No. PCT/EP2019/073374.

* cited by examiner

SHIP HULL HAVING A RAISED PORTION IN THE REGION OF AN UNDERSIDE OF THE SHIP HULL

The invention relates to a hull with an elevation of an outer contour of the hull with respect to an upwards directed vertical direction of the hull in the region of a first and a second body plan in relation to a surface section immediately adjoining to the elevation. In particular, a hull for a container ship is addressed.

Often, container ships convey a plurality of goods. Therein, container ships usually transport considerably heavier loads than an aircraft. Large modern container ships can have a load capacity of multiple thousand tonnages. Therein, the mass of the containers transported therein mostly considerably exceeds the load capacity of an aircraft. A large part of the goods is transported via container ship in the worldwide trade. This transport of goods requires a correspondingly high energy input.

This energy is mostly obtained from a fuel, in particular marine diesel. Due to the increasing competition within the scope of the globalization, the ship owners worldwide face great challenges in shipping. Already now, the fuel costs present a main constituent of the operating costs for the ship owners. In addition, the ship owners are confronted with challenges relating to the environmental protection. Already now, this can urge the ship owners to high investments, which can adversely affect the corresponding margins.

The published patent application DE 10 2010 036 069 A1 describes a flow system for the shipbuilding. A special shaping in the hull bottom for monohull and multihull ships for all forms of shipbuilding without lateral buoyancy body is described.

The printed matter US 2014/0083346 A1 discloses a boat for wake surfing and a hull for a wakesurfing boat. The hull includes a bottom with a preset length extending from a bow up to a stern. A central rib as well as a starboard and larboard rib are located on the bottom of the hull, which extend on the starboard side to the larboard side and thus define substantially an M-shape. A trim wedge extends below the stern. Two rounded stern parts are provided in the vicinity of the stern. The wakesurfing boat provides multiple Tillable ballast tanks. The wakesurfing boat serves for generating wake waves. With the aid of different operating states of the wakesurfing boat, different wake waves with respect to the shape, slope and strength can be generated.

The printed matter U.S. Pat. No. 1,599,312 A describes a hull, which has its largest width of the carrier in the front region, which rises over a substantially flat bottom region. The propeller and the rudder are arranged below the hull behind the longitudinal center and at the junction of two channels with the single channel. In the front region, the described hull has its largest width of a streak. This streak rises in relation to a flat bottom. Therein, the channels begin in this region with the flat bottom and extend rearwards. There, the channels merge to a single channel.

It is the object of the present invention to provide a hull, which allows a more efficient operation of a ship.

This object is reasonably solved by the independent claims of this application. Advantageous developments and alternative forms of configuration are given in the dependent claims, the description as well as the figures.

The invention provides a hull with an elevation of an outer contour of the hull with respect to an upwards directed vertical direction of the hull in the region of a first and a second body plan in relation to a surface section immediately adjoining to the elevation. Therein, the second body plan is preferably located closer to a stern of the hull in relation to the first body plan. The hull is in particular configured for a container ship, a bulk carrier or a tanker. Instead of the term bulk carrier, the term bulker is often also used. However, the proposed hull can also be employed for smaller ships, boats as well as for all other cargo ships. For example, 400 meter container ships or 200 meter container ships are addressed by the term container ship.

The elevation is arranged in a region between a middle and a stern of the hull. The elevation can be located in a region between a waist and the stern of the hull, wherein the elevation is located on a bottom side of the hull. Thus, the elevation is arranged on the bottom side of the hull. This means that the elevation of the hull is located in the region of an underwater hull of the hull. Accordingly, with a ship traveling on a water surface, the elevation is not visible or at least not completely visible since it is arranged below the water line in this case. With the aid of this elevation, a water flow in the region of the elevation can be more efficiently utilized with respect to a drive of the ship than previous hulls.

The outer contour in the first body plan, which extends in a bow-side region of the elevation, comprises a first turning point and a second turning point. The bow-side region of the elevation faces the bow of the hull. In particular, that part of the outer contour of the first body plan is addressed, which extends below the water line, thus in the region of the underwater hull. In particular, the elevation can be centrally arranged in transverse direction. In the first body plan, the outer contour reaches a maximum value with respect to the vertical direction in a region of a center of the elevation. If one would view the hull from below, thus, the elevation would tend to look like an "indentation", which curves upwards in the direction of the water line. The elevation is preferably centrally arranged in the first body plan. A body plan represents a cross-section through the hull. It can also be described as a vertical section through the hull in transverse direction. Therein, the transverse direction mostly extends perpendicular to a longitudinal direction, which connects the bow to the stern.

At the lateral ends of the outer contour of the first body plan, the outer contour can extend similar to a usual container ship. However, this outer contour mostly rises towards the center of the body plan such that the elevation results from it. Since the elevation reaches a maximum value in the region of a center of the first body plan, the rise of the outer contour flattens in the region of the center. This inevitably means that the outer contour comprises a first and a second turning point in the first body plan. Therein, the first and the second turning point are mostly arranged in the region of the elevation. Usually, a distance of the first turning point to the second turning point can be several meters. However, the exact distance in particular depends on a position of the first body plan. In particular, the outer contour of the first body plan can comprise exactly two turning points. The first turning point can for example be placed on a left side of the elevation, the second turning point can be placed on a right side of the elevation. Therein, the outer contour of the first body plan preferably represents a bounding line of the hull. This means that the outer contour of the first body plan characterizes a boundary of the surface of the hull. The area resulting from the first body plan can for example include an engine compartment for a ship's engine, cabins etc. Preferably, the outer contour of the first body plan is mathematically differentiable. This in particular applies to the outer contour in the region of the elevation. This can mean that the outer contour of the first body plan does not comprise knees or steps at least in the region of the elevation.

The outer contour in the second body plan, which is located closer to the stern of the hull in relation to the first body plan, comprises a first depression with a third turning point and a fourth turning point centrally in the elevation. Therein, the first depression is a part of a retaining device for a ship propeller shaft for receiving a ship propeller. The retaining device can also be referred to as "afterbow" or as a "stern bulge". This retaining device in particular protrudes vertically downwards from the elevation and is preferably arranged centrally in the elevation. The retaining device can be a part of the hull, which means that the hull including the retaining device can be configured one-part or multi-part. Alternatively, it is possible that the retaining device is connected to the hull as a separate component. In transverse direction, the retaining device in particular transitions into the elevation. Thus, the elevation can surround the retaining device. Preferably, this retaining device includes the ship propeller shaft, which can drive the ship propeller with the aid of a ship's engine.

Previously, the ship propeller was often referred to as ship screw. These two terms are used as synonyms in this application. The word propeller can also be used instead of ship propeller. Ship propellers are mostly elements of a fluid kinetic machine, which can absorb mechanical work and output it to the medium surrounding it in the form of flow energy. With ships, the surrounding medium is mostly water, with aircrafts, it is air. Thereby, both fresh water and salt water are addressed. Often, ship propellers are a part of a working machine. Usually, they absorb energy from the ship's engine and convert this energy into a drive of the ship. Usually, ship propellers comprise vanes, which are shaped and oriented such that they are obliquely or asymmetrically flown around by the water upon a rotational movement. The size and mass of ship propellers can severely vary according to ship type and purpose of employment. In a container ship, the ship propeller can reach a diameter of 10 m and the associated container ship can reach a load capacity of above 1000 TEU (tonnages). In smaller ships or boats, the ship propeller can be correspondingly smaller and have considerably less mass, respectively, than a propeller of a large container ship.

The outer contour of the second body plan is located closer to the stern than the outer contour of the first body plan. The outer contour of the first body plan can be described as trough-shaped or pot-shaped in the region of the elevation. It rises upwards in the direction of a preset water line starting from a region of the bottom side of the underwater hull in the direction of the elevation and reaches a maximum level. In contrast thereto, the outer contour of the second body plan again leaves the elevation in the region of this maximum level. Laterally of the depression, however, an elevation can still be recognized. In particular, the elevation with the associated maximum level is located laterally of the first depression in the second body plan. One can say that the elevation extends laterally around the retaining device, wherein the elevation the retaining device is not completely surrounded by the elevation towards the stern. The outer contour of the second body plan in particular rises upwards in the direction of the elevation starting from the adjoining surface section over the third turning point. The outer contour can also reach a further maximum value in the second body plan in the region of the elevation, but then centrally descends downwards over the fifth turning point in the region of the elevation. Therein, the outer contour of the second body plan can reach a minimum value in the region of the first depression. This minimum value can be formed as a local or even global minimum relating to the hull.

In the further progression, the outer contour of the second body plan can again rise over the sixth turning point. Then, it preferably reaches the same maximum level as between the third and the fifth turning point. In the further progression, the outer contour of the second body plan can again descend over the fourth turning point. The outer contour of the second body plan in the region between the third and the fourth turning point is in particular a part of the elevation even if the first depression is present. Preferably, the entire hull is symmetric along a preset central line. This means that the outer contours of the body plans can also be symmetric. If the container ship comprises multiple ship propellers, thus, multiple axes of symmetry can be correspondingly present. Accordingly, the represented progression of the outer contours of the first and the second body plan can occur multiple times in a hull.

The outer contour in the second body plan comprises a fifth turning point and a sixth turning point. Therein, the third turning point is farther outwards transverse to the hull in relation to the fifth turning point with respect to the first depression and the fourth turning point is farther outwards transverse to the hull in relation to the sixth turning point with respect to the first depression. This means that the fifth turning point and the sixth turning point can be located closer to a center of the elevation and to an axis of symmetry for the elevation, respectively. Therein, the third and the fourth turning point are usually farther outwards away transverse to the hull.

Transverse to the hull can particularly mean a direction, which is formed perpendicularly to the longitudinal direction. Therein, farther outwards can mean that a distance to the central line in transverse direction is increased. If the third turning point is farther outwards in relation to the fifth turning point, this can mean that a distance from the third turning point to the central line is larger than a distance from the fifth turning point to the central line. According to hull, the central line can be the axis of symmetry of the hull at the same time. In this case, the third and the fourth turning point are closer to a side of the hull than the fifth and the sixth turning point. Therein, the term "lateral" means a transverse direction of the hull. This transverse direction is preferably perpendicular to a longitudinal direction of the hull. Broadly speaking, "lateral" means something similar to "to the left" and "to the right" of the hull, respectively, if one views the hull from the perspective of a body plan.

In a longitudinal section of the hull, the outer contour comprises a seventh turning point along a preset central line of the elevation on the bow side in the region of the elevation. Therein, the central line can extend through a center of the elevation and preferably symmetrically divides this elevation. On the stern side, this outer contour of the longitudinal section comprises an eighth turning point. On the stern side, the outer contour transitions from the elevation into the first depression over an eighth turning point. On the bow side, the elevation in particular adjoins to the adjoining surface section.

Starting from this surface section, the outer contour can transition into the elevation of the hull over the seventh turning point. Therein, the outer contour can rise in the direction of the water line and reach a maximum value or a maximum level. In the region of this maximum level, the elevation can horizontally extend. However, it can also be curved or be a combination of horizontal area and curved area. The outer contour of the longitudinal section on the bottom side of the hull can first horizontally extend starting from the maximum level. In the further progression of the outer contour in the direction of the stern, the outer contour descends downwards and thus leaves the maximum level of the elevation. Therein, the outer contour transitions into the first depression over the eighth turning point. This transition is in particular continuous. Therein, the first depression can be arranged deeper than the adjoining surface section in the bow-side region of the elevation. The outer contour of the longitudinal section can further transition into the region of the ship propeller. The progression of the outer contour of the longitudinal section resulting from it in the region of the underwater hull can be described as an upwards directed trough, but which is not symmetric from the view of the longitudinal section. This is in particular due to the fact that the first depression can have a different vertical level compared to the adjoining surface section in the bow-side region of the elevation. The outer contour can first rise over the seventh turning point coming from the bow region, reach the maximum level of the elevation and again descend from the elevation over the eighth turning point. The outer contour transitions into the first depression over the eighth turning point and can reach the ship propeller.

Furthermore, a vertical position of the elevation adapts to a vertical position of the surface section adjoining thereto at the stern-side end of the elevation along the longitudinal section in the direction of the stern. Before the stern of the hull is reached along the longitudinal section, the adjoining surface section can have a vertical position different from the elevation. These two different vertical positions or level heights in particular increasingly decrease in the direction of the stern until this difference of the vertical positions completely disappears. Therein, this adaptation is mostly not abruptly effected, but preferably in continuous manner.

This adaptation of the vertical position of the elevation to the vertical position of the surface section adjoining thereto cannot only apply along the longitudinal section of the central line, but also to further longitudinal sections, which are laterally offset to the central line, but extend through the elevation. Thus, a longitudinal section can for example also be addressed, which does not divide the elevation in half like the central line, but extends in the region of for example a fourth of the transverse extension of the elevation. In this case, such a longitudinal section would divide the elevation into two partial regions, which are of different size in terms of area. In this case too, the adaptation of the mentioned vertical positions can be effected.

Otherwise stated, the surface section cannot at least completely enclose the elevation rearwards in the direction of the stern. This in particular means that the elevation is open to the rear or does not completely terminate. Thus, the elevation can result in a rearwards open shape. This rearwards open shape can be arranged in the region of the underwater hull of the hull.

This shape or shaping of the hull is already given by the shaping of the hull and is not generated during an operation of the ship. Thus, opening a flap as it can for example often be found in ferry boats does not represent a rearwards open shape in terms of this application. This shaping, which looks open to the rear, can be continuously and permanently given due to the shaping of the hull. Due to this shaping of the hull according to claim 1, less hydrodynamic resistances arise in the region of the water flow around the hull. The displaced water can be better conducted in the direction of the ship propeller along the ship's hull under pressure. Due to the elevation in the hull, more water is directed to the ship propeller than without the elevation.

According to design of the ship and the dimensions of the elevation, respectively, up to ca. 10 percent of the fuel amount can be saved. A huge potential with respect to cost saving as well as reduced emission of greenhouse gases results from it. Thereby, the thus proposed hull can allow a considerably more efficient operation of container ships and make an enormous contribution to the environmental protection at the same time. Since especially in the field of the ship traffic huge amounts of greenhouse gases are emitted compared to the road traffic, the contribution to the environmental protection and climate protection, respectively, by the proposed hull is to be estimated as not too low.

The outer contour of the longitudinal section can comprise exactly two turning points in the region of the elevation. Therein, these two turning points are the seventh and the eighth turning point. The outer contour in the second body plan can in particular comprise exactly four, or as it is shown in a later example, exactly six turning points. The outer contour of the first body plan can comprise exactly two turning points in the region of the elevation, which are the first and the second turning point. A possible determination of a defined number of turning points in the progression of the outer contour in the region of the elevation is to clarify that the progression of the outer contour follows a systematic. Thus, the outer contour in the second body plan for example rises in the region of the third turning point in the direction of the elevation. However, it is therein insignificant if the progression of the outer contour slightly deviates from the proposed shape due to a small groove, a constructional manufacturing tolerance or due to another reason. Herein, the entire progression of the outer contour and the entire shape of the elevation in the hull, respectively, are crucial. Minimum deviations from the shaping described in this application are also encompassed within the scope of this application. A minimum deviation can for example be present if the region or shape relating to the deviation has a spatial extension, which is less than 1% of a width of the elevation.

A further variant according to the independent claim 2 describes a hull in particular for a container ship, a bulk carrier or a tanker with an elevation of an outer contour of the hull. This elevation is elevated in the region of a first and a second body plan with respect to an upwards directed vertical direction in relation to a surface section immediately adjoining to the elevation. This can mean that a vertical position of the elevation is different from a vertical position of the adjoining surface section. The elevation is arranged in a region between a middle and a stern of the hull. The elevation is located on a bottom side of the hull.

The outer contour in the first body plan, which extends in a bow-side region of the elevation, comprises a first turning point and a second turning point. The outer contour in the first body plan reaches a maximum value with respect to the vertical direction in a region of a center of the elevation. The outer contour in the second body plan is located closer to the stern of the hull or is arranged closer to the stern of the hull in relation to the first body plan. In the second body plan, the outer contour comprises each one second depression with a ninth turning point and a tenth turning point on both sides of the elevation along a transverse direction of the hull. Therein, each second depression is a part of a retaining device for each one ship propeller shaft for receiving a respective ship propeller. The outer contour in the second body plan reaches a further maximum value with respect to the vertical direction in a region of the center of the elevation.

Thereby, a further maximum value can be reached in the second body plan, which is different from the maximum value of the first body plan. The outer contour comprises a seventh turning point in a longitudinal section of the hull along a preset central line of the elevation on the bow side in the region of the elevation and transitions from the elevation into a stern-side section of the hull over an eighth turning point on the stern side. At the stern-side end of the elevation, a vertical position of the elevation adapts to a vertical position of the surface section adjoining thereto along the longitudinal section in the direction of the stern.

Thereby, the claim 2 can describe a hull as distinct from claim 1, which can comprise multiple retaining devices for multiple ship propellers. In this variant, a first depression is not centrally arranged in the second body plan. The retaining devices for the ship propellers in particular arise by the second depression on both sides of the elevation. Exactly two retaining devices can arise from it. One thereof can be arranged on the left side, the other one can be arranged on the right side of the elevation.

A retaining device is not provided in the center as in claim 1. More than two retaining devices, formed by the respective second depression, can also be provided. Thereby, a drive power for a container ship can be increased. Often, additional ship propellers or ship screws can generate more drive power than a single constructionally identical ship screw. An improved incident flow of the respective ship screw can also be achieved by the hull described in claim 2. Thereby, the drive power cannot only be increased due to additional ship screws, but an additional improvement in efficiency of the ship drive can moreover be achieved due to a better incident flow of respective ship screws. The advantages mentioned in the other embodiments and examples analogously apply to claim 2. A transverse extension of the elevation perpendicular to a longitudinal direction of the hull can for example be between 50% and 80% of the width of the hull. In particular, the transverse extension can be ⅔ of the width of the hull in this case.

A further embodiment of this invention provides a hull, wherein a longitudinal extension of the elevation, a transverse extension of the elevation and/or a vertical extension of the elevation are set depending on a preset function with a load requirement. The longitudinal extension preferably extends along a longitudinal axis of the hull. Such a longitudinal axis preferably connects the bow to the stern of the ship. The transverse extension can extend perpendicular to the longitudinal extension and can also be referred to as a horizontal extension laterally to the longitudinal extension. A vertical extension in particular extends upwards from a bottom side of the underwater hull in the direction of the water line. This means that the exact dimensions of the elevation, thus a length, width and depth of the elevation, can be dependent on user requirements.

The vertical extension of the elevation can be some centimeters to several meters according to ship type. In a container ship, this vertical extension can for example be about 1 m. For example, the vertical extension of the elevation can be a value between 0.5% and 10% of the width of the hull. Therein, the exact value in particular depends on the user requirement as well as on the concrete hull. The transverse extension of the elevation can in particular be dependent on a special extension of the ship propeller. Especially, a user requirement can influence the spatial dimensions of the elevation. Such a user requirement can for example be a speed for a container ship with a preset load. Similarly, a requested draught for the hull can be provided for a loading state of the ship. This requested draught can influence the dimensions of the elevation. Usually, each ship will be individually designed to the user requirement. This also relates to the concrete configuration of the elevation.

For example, if a container ship with a load capacity of about 15000 tonnages is desired, which is to reach a speed of about 25 knots at the same time, thus, the dimensions of the elevation are configured depending on this function with the associated load requirement. In this case, the function is a normal forward travel of the container ship. The load requirement is the speed in this case, which the container ship is to reach with preset loading state. The longitudinal extension of the elevation can for example assume values between 15% and 50% of the longitudinal extension of the hull. In particular, the longitudinal extension of the elevation can be ⅓ of the length of the hull. Therein, the elevation can be arranged in the rear third of the hull. The elevation can be ⅓ of the length of the hull in its longitudinal extension and begin in a region of the waist and extend in the direction of the stern at the same time. Thereby, a particularly beneficial incident flow of the ship propeller can be realized.

A further embodiment provides that the elevation rises in the direction of a preset water line towards the stern. The vertical position of the elevation in particular adapts to the vertical position of the surface section adjoining thereto along the outer contour of the longitudinal section in the direction of the stern. Most of the hulls rise in the direction of the stern. This analogously applies to the elevation. This in particular means that there is a region, in which the elevation more severely rises than the adjoining surface section. In the stern-side region of the hull, the elevation can less severely rise than the adjoining surface section to transition into a common stern-side area with the adjoining surface section. Thereby, a rearwards open shape of the hull preferably arises. This for example causes that a water flow guided in the elevation can be efficiently discharged to the rear. Turbulences in the water flow can be reduced, which can advantageously affect the ship drive.

A further embodiment of this invention provides that the elevation comprises a base area and a part of the base area facing the bow region is formed as an elliptical segment, parabolic segment and/or circular segment. The elevation is in particular an area, which is not only in one plane in the space. Therein, a projection of the elevation to a horizontal area along the vertical direction can result in a two-dimensional area. This area represents a part of the elevation. In particular, that area portion with the maximum value or the maximum level represents the base area. The base area can be a perpendicular projection to a horizontal area. This can mean that the base area can be two-dimensional. In particular, that part of the base area, which faces the bow, can be designed as a circular segment, elliptical segment and/or parabolic segment.

The bow-side region, thus that part of the base area, which faces the bow region, can be arcuately formed. This arcuate shape can occur in the form of an elliptical segment, parabolic segment and/or circular segment. Preferably, the base area transitions from this arcuate shape into a further area section of the base area in the direction of the stern, the lateral bounding lines of which can extend parallel. This further area section of the base area can be described as a trapezoid or rectangle. However, it is therein to be noted that the adjoining shape mostly does not terminate to the rear, but is open. Due to this arcuate base area, a smooth transition from the adjoining surface section to the elevation can be realized on the bow side. This can further improve the hydrodynamic characteristics of the hull.

A further embodiment provides a hull, wherein two bounding lines of the base area of the elevation always have an identical distance to each other in longitudinal direction at least in the stern-side half of the elevation. If the base area is two-dimensional in a section of the elevation, thus, the two bounding lines are preferably parallel to each other. This section can have a shape similar to a rectangle. With a base area curved in the space, the bounding lines preferably extend such that the intermediate distance remains the same. Thereby, the elevation can continue with the same width towards the stern. This width can be tailored to the ship propeller, which can thereby be flown upon in improved manner.

In another embodiment, the two bounding lines can slightly drift apart towards the stern, thus, the distance between these bounding lines can increase. Therein, a possible increase of the distance can be less than 5% of the smallest distance in the stern-side half of the elevation. Thereby, improved incident flow of different ship propellers can be realized and the flow effect of the elevation can be additionally varied.

A further embodiment of this invention provides that the elevation comprises an intermediate area immediately adjoining to the surface section and a projection of the intermediate area to a vertical area perpendicular to the vertical direction and/or parallel to a transverse direction tapers on the stern side such that the elevation and the adjoining surface section transition into each other into a common stern-side area of the hull in the longitudinal direction of the hull to the stern. Preferably, the intermediate area is between the adjoining surface section and the base area. With the aid of the intermediate area, the different vertical positions of the base area as well as the surface section can be bridged. The intermediate area in particular includes the first, the second as well as the third and fourth turning point. If one projects the intermediate area to a vertical area perpendicular to the vertical direction and/or parallel to the transverse direction, thus, a two-dimensional area again arises. The thus formed area can be referred to as "projected intermediate area".

This intermediate area can extend along the longitudinal section of the elevation for the most part. Only at the bow-side end of the elevation, the intermediate area can assume an arcuate shape. Otherwise, the intermediate area preferably extends parallel to the central line of the hull. In a central region of the elevation, the projection of the intermediate area preferably results in two parallel lines. These two parallel lines can gradually taper at the stern-side end of the elevation. Otherwise stated, these two lines bounding the intermediate area preferably converge on the stern side. It in particular results from it that the vertical position of the base area adapts to the vertical position of the adjoining surface section. These two vertical positions and these two areas, respectively, can transition into each other into the common stern-side area of the hull. Accordingly, the elevation "disappears" in the direction of the stern without therein abruptly terminating. Since abrupt changes of the outer contour of the hull are not generated thereby, a water flow in the region of the elevation can be effectively directed to the ship propeller with less stall.

A further embodiment provides a hull, wherein the base area and/or the intermediate area comprise a curvature in the direction of the preset water line. This in particular means that the elevation extends in the direction of the water line. This curvature can point to the opposite direction in the region of the first depression. The curvature in the direction of the preset water line can only relate to the intermediate area. This means that the associated turning points are mathematically more clearly defined. Thus, a third derivative of the progression of the outer contour is for example determined with respect to its sign in the turning point. Corresponding turning points such as for example the third and the fourth turning point have a different sign relating to the third derivative of the outer contour in the turning point. Thereby, the adjoining surface section can be transferred into the base area via the intermediate area. In the region of the curvature, the progression of the associated outer contour is therein preferably continuously differentiable. Differentiable means in this context that the progression of the outer contour is always defined via the so-called differential quotient. At each point of the outer contour, at least in the region of the elevation, thus, the differential quotient is calculable. Thereby, an applied water flow can be effectively directed in the direction of the ship screw or the ship propeller.

A further embodiment provides that the outer contour in the first body plan in the bow-side region of the elevation transitions from the adjoining surface section into the curved intermediate area with the first turning point along a preset transverse direction of the hull, the outer contour subsequently transitions into the base area, the outer contour again transitions into the curved intermediate area with the second turning point after the base area, wherein a third mathematic derivative of a progression of the outer contour of the first body plan has a sign in the first turning point different from the second turning point and the outer contour does not comprise further turning points. This preferably relates to the outer contour on the bottom side of the underwater hull. The progression of the outer contour resulting from it is preferably symmetric with respect to the central line of the hull. Preferably, the outer contour of each body plan is symmetric to the central line in the region of the elevation. Thereby, a harmonic flow profile can be realized, which beneficially affects the ship drive.

A further embodiment provides a hull with the ship propeller, wherein the transverse extension of the elevation perpendicular to the longitudinal direction of the hull is set depending on a width of the ship propeller, wherein in particular the transverse extension of the elevation is maximally one third of a width of the hull. In order to optimally use the elevation for a ship drive, it is very reasonable to match the width of the elevation to the dimensions of the ship propeller. Therein, the transverse extension of the elevation usually extends perpendicularly to the preset central line. Along the transverse extension, one can get from a left-side intermediate area to a right-side intermediate area of the elevation. This transverse extension can be lower in the bow-side area of the elevation, since the elevation can assume an arcuate shape there. In the stern-side area of the elevation, it can reach its maximum transverse extension. Therein, this maximum transverse extension of the elevation can be set depending on a width of the ship propeller.

The transverse extension of the elevation can be slightly wider than a width of the ship propeller provided thereto. For example, the transverse extension of the elevation can be wider by 20% than the associated ship propeller. However, this embodiment in particular provides that the transverse extension is maximally one third of the width of the hull. This for example means that the first turning point has a distance from the second turning point in the first body plan, which is one third of the width of the hull. With a hull with a width of 60 m, this distance would accordingly be 20 m, with a 32 m wide hull, the distance would be about 10 to 11 m. With respect to the third and fourth turning point, the above mentioned explanations can be correspondingly transferred. Due to the possible arcuate shape of the intermediate area, the distance from the first turning point to the second turning point can be less than the distance from the third turning point to the fourth turning point.

However, the distance of the first turning point to the second turning point can turn out lower. This particularly depends on the fact where the first body plan extends. In the region facing the bow, the elevation can be arcuately configured. Accordingly, the first and the second turning point approach if the first body plan is shifted in the direction of the bow. Due to this progression of the elevation, the applied flow can be optimally utilized and a ship stability of the hull is therein not affected at the same time.

A length of the elevation can be defined from the bow-side end of the elevation up to the stern of the hull. In this case, the first body plan can for example be apart from the bow-side end of the elevation by 1% to 20% of the length of the elevation. With respect to the second body plan, the distance can be 25% to 80% of the longitudinal extension of the elevation.

A further embodiment provides a hull, wherein the transverse extension of the elevation assumes a value between 80% and 150% of the width of the ship propeller, in particular is larger by 15% to 25%, preferably by 20% than the width of the ship propeller. If the transverse extension is 120% of the width of the ship propeller, thus, the applied water flow can be optimally used for driving the container ship. This means that the transverse extension, in particular the maximum transverse extension, of the elevation can be 1.2 times the width of the ship propeller. Instead of the term "ship propeller", the word "ship screw" also often occurs. Within the scope of this application, these two terms mean the same. With a container ship of a length of 400 m, a ship propeller with a diameter of about 10 m can for example be provided, with a container ship of a length of 200 m, the diameter can be about 8 m. The transverse extension of the elevation would be 12 m in this example with the 400 m container ship, with the 200 m container ship, the value accordingly would be 9.6 m.

In the development of the hull, as it is presented in this application, it has manifested that an elevation, which is wider by 20 percent than the associated ship propeller, can generate a very good increase in efficiency with respect to the drive of the ship. However, with smaller ships, a lower transverse extension can be reasonable. Thus, an improved incident flow on the ship propeller as well as the increase in efficiency in the ship drive associated therewith can be observed at 80% and also at 150% of the width of the hull. Reasonably, the transverse extension is only specified if the ship type as well as the associated requirements are known.

A further embodiment provides a hull, wherein the outer contour in the first body plan and/or the outer contour in the second body plan each comprise a second depression with a ninth turning point and a tenth turning point on both sides of the elevation along a transverse direction of the hull. This in particular means that the intermediate area does not directly transition into the adjoining surface section, but the second depression is located between. The second depression appears in the body plan as two partial regions, which can be arranged laterally of the first depression. The progression of the outer contour of the second body plan can comprise two additional turning points in the case of the second depression. It can be provided that the outer contour comprises exactly two turning points in the region of the second depression. Therein, the first depression is preferably located centrally in the elevation and can reach a global minimum relating to the outer contour of the second body plan. Besides this global minimum, the outer contour can comprise two further local minimums in the region of the second depression. Since the outer contour is preferably mirror imaged with respect to an axis of symmetry, the outer contour of the second body plan can comprise two partial regions of the second depression. Accordingly, the first partial region of the second depression is arranged to the left of the first depression, the second partial region of the second depression is arranged to the right of the first depression.

Starting from the region of the elevation, a vertical position of the outer contour usually does not extend directly to the adjoining surface section towards the side over the third turning point in case of the second depression. The vertical position of the outer contour can first decrease, lead to the second depression and again increase in the direction of the adjoining surface section after the minimum value there. Thus, the outer contour can first transition into the second depression over the third turning point. This second depression can comprise a local minimum or a minimum value. The outer contour can transition into the adjoining surface section over the ninth turning point.

Descriptively speaking, this means that the elevation can be laterally delimited in relation to the adjoining surface section by two further depressions. However, the second depression can decrease in the direction of the stern in a longitudinal section of the hull. This in particular means that the second depression is not constantly formed with respect to its depth along the preset central line, which mostly extends parallel to the longitudinal direction of the hull. The second depression can decrease on the stern side such that the elevation, the second depression as well as the adjoining surface section transition into a common stern-side area. By these two additional depressions, the water flow can be efficiently guided in the region of the elevation. The thus guided water flow can encounter the ship propeller in the region of the stern-side end of the elevation and thus more efficiently set it in motion. Thereby, a part of the water flow can be used for the ship drive. In ideal case, a fuel saving of more than 10 percent in relation to a hull without the elevation can result.

A further embodiment provides a hull, wherein a vertical position of the stern-side area adapts to the vertical position of the elevation at the stern-side end of the elevation along the longitudinal section in the direction of the stern. In particular, a vertical position of the second depression can adapt to the vertical position of the elevation and of the stern-side area in the direction of the stern, respectively. This means that the hull can gradually transition into a single stern-side area in the direction of the stern. From a certain point in the direction of the stern, the surface of the hull can no longer be differentiated in different partial areas. The stern-side area can be a curved area, which rises upwards in the direction of the water line. Thereby, the rearwards open shape of the hull can be provided. This allows a hydrodynamic efficient "flow-off" of the water flow, which beneficially affects the ship drive.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims.

Now, the present invention is explained in more detail based on the attached drawings. Therein, it is to be noted that the drawings are not to scale. All of the drawings are schematic and are to help to better understand the underlying principle of this invention. In particular, the drawings are to facilitate the comprehension of the claims. Based on the drawings, it is to be clarified, which shaping the hull, in particular the elevation, has and which aspects differentiate this hull from usual hulls. Restricting features or even specific dimensions for the hull or the elevation cannot be derived from the figures as well as from the description of figures. The figures show the following.

Figure 1:
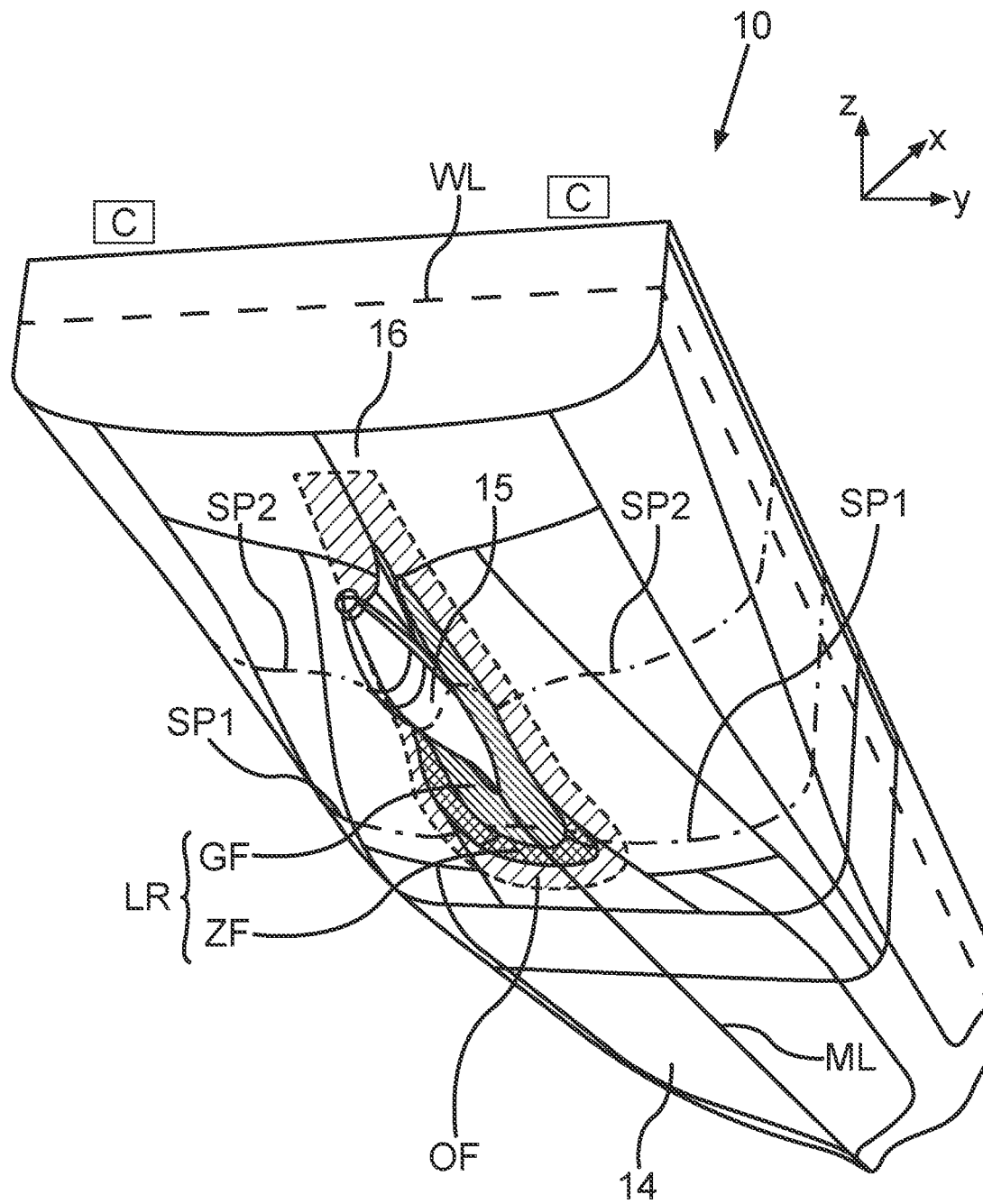
FIG. 1 is a schematic three-dimensional representation of a hull with an elevation.

FIG. 1 exemplarily and schematically shows a hull 10 with an elevation LR in the region of a bottom side of the hull 10. Therein, this bottom side of the hull 10 is arranged in a region of an underwater hull US. The elevation LR is preferably in a region, which extends from a waist MS up to a stern 16 of the hull 10. The elevation LR can be divided into different areas. The region of the elevation LR dashed around a retaining device 15 represents a base area GF. A dashed region of the elevation LR further adjoining to the side represents an intermediate area ZF. An adjoining surface section OF is arranged around the intermediate area ZF. Therein, the elevation principally follows the shape of the hull 10 in longitudinal direction.

A first depression V1 protrudes centrally from the elevation LR. This first depression V1 is a part of the retaining device 15 for a ship propeller 12. The hull 10 in FIG. 1 exemplarily shows a central line ML, which symmetrically divides the hull 10. The shape of the elevation LR is preferably also symmetrically formed. The retaining device 15 in the region of the first depression V1 can include a ship propeller shaft, which receives the ship propeller 12. The ship propeller shaft is preferably connected to a ship's engine. FIG. 1 also shows a coordinate system with a z-axis, an x-axis as well as a y-axis. Instead of z-axis, it can also be spoken of z-direction. This analogously applies to the other axes. The z-axis represents the vertical direction, the x-axis represents the longitudinal direction of the hull 10 and the y-axis represents a transverse direction of the hull 10.

FIG. 1 schematically also shows two containers C, which are located on a surface of the hull 10. This is to facilitate the orientation. FIG. 1 also shows a water line WL, which divides the hull 10 into an underwater hull US as well as a part of the hull 10 located above. In FIG. 1, two outer contours AK to different body plans are exemplarily indicated. Therein, a first body plan SP1 extends through a bow-side part of the elevation LR. A second body plan SP2 extends through a region of the elevation LR, in which the retaining device 15 is already clearly recognizable. Accordingly, the second body plan SP2 is located closer to the stern 16 of the hull 10 than the first body plan SP1.

Figure 2:
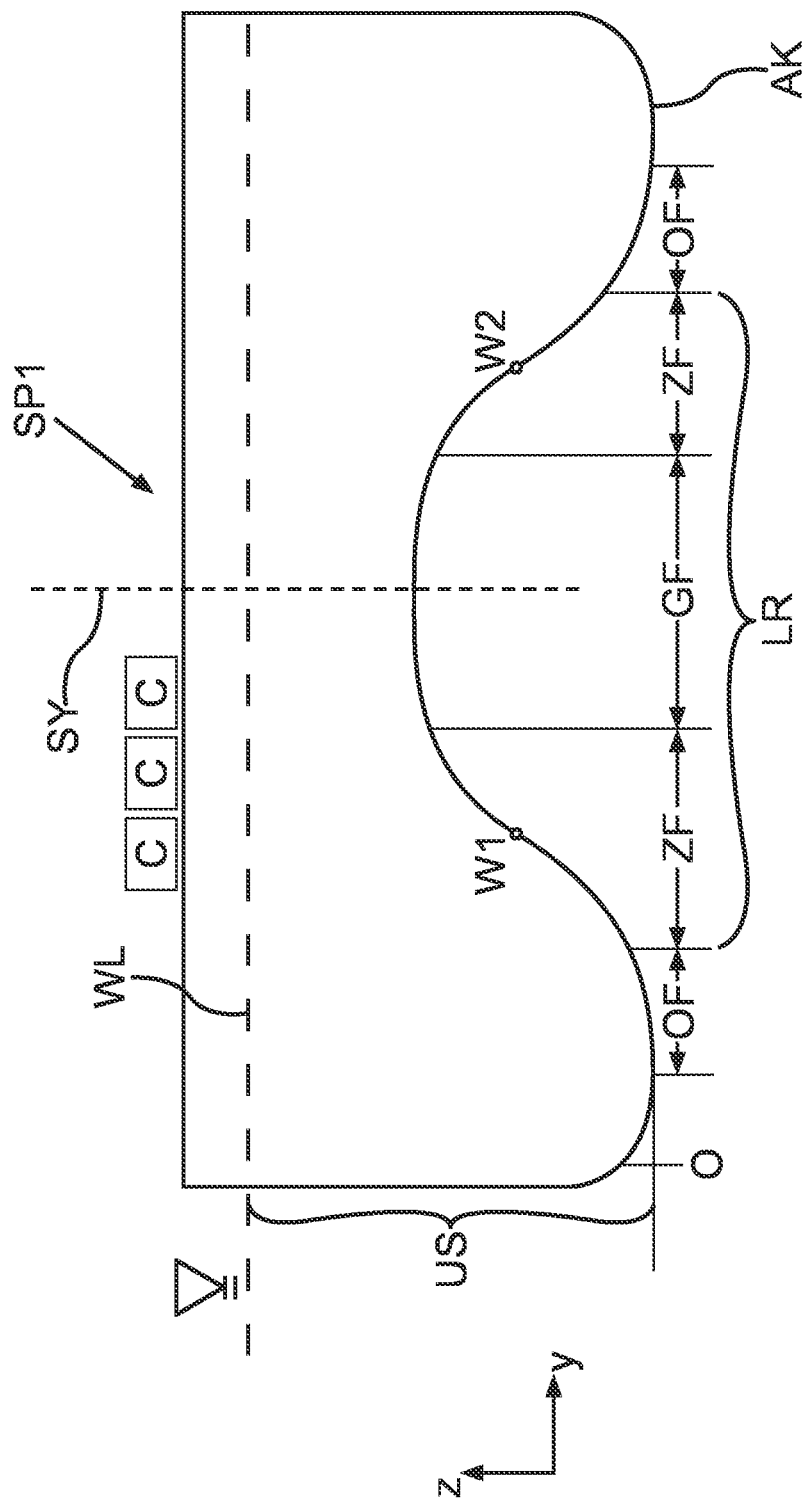
FIG. 2 is a schematic representation of a first body plan of the hull with the elevation.

FIG. 2 exemplarily shows the first body plan SP1. Therein, the associated outer contour AK is always of particular importance in the body plans. The progression of the outer contour AK can influence the shaping of the hull 10. The water line WL divides the hull 10 into the underwater hull US as well as a portion, which is located above. FIG. 2 exemplarily shows three containers C, which are located on a surface of the hull 10. In the following, the progression of the outer contour AK is described according to FIG. 2 from left to right starting from a start point O. Therein, the description of this progression of the outer contour AK is to facilitate the comprehension of the claims.

To the left of the start point O, the outer contour AK extends vertically downwards in the direction of positive y-direction, then turns to the right in the direction of the adjoining surface section OF and reaches the start point O. Up to this point, the progression of the outer contour AK usually corresponds to that of a usual hull 10. In the region of the adjoining surface section OF, the vertical extension of the outer contour AK reaches a minimum. In the further progression of the outer contour AK in positive y-direction, the outer contour first rises over a first turning point W1. The first turning point W1 is arranged in the region of the intermediate area ZF in the example of FIG. 1. That is, the outer contour AK first vertically rises in z-direction with respect to the coordinate system of FIG. 2 and reaches a first maximum slope in the first turning point W1.

In the further progression of the outer contour AK in the direction to a second turning point W2, the slope of the outer contour AK first again decreases and reaches preferably a slope of 0 in the region of the base area GF. This means that the base area GF can be horizontally formed. The further progression of this outer contour AK can be very simply represented with the aid of an axis of symmetry SY. Preferably, the entire hull 10 as well as the elevation LR associated therewith is symmetric to this axis of symmetry SY. This means that mirroring the outer contour AK on the axis of symmetry SY can explain the further progression of the outer contour to the right of the axis of symmetry SY.

To the right of the axis of symmetry SY, the outer contour AK first extends horizontally and then descends in the region of the intermediate area ZF over the second turning point W2. The outer contour AK reaches the adjoining surface section OF adjoining thereto over the second turning point W2. The elevation LR in the first body plan SP1 illustrated in FIG. 2 can be referred to as trough-shaped, pot-shape-like or U-shape-like. Therein, the elevation LR extends from the intermediate area ZF with the first turning point W1 up to the intermediate area ZF with the second turning point W2. The progression of the outer contour AK preferably does not comprise kinks or jumps at any location in the region of the underwater hull US. This means that the outer contour AK is mostly differentiable.

Figure 3:
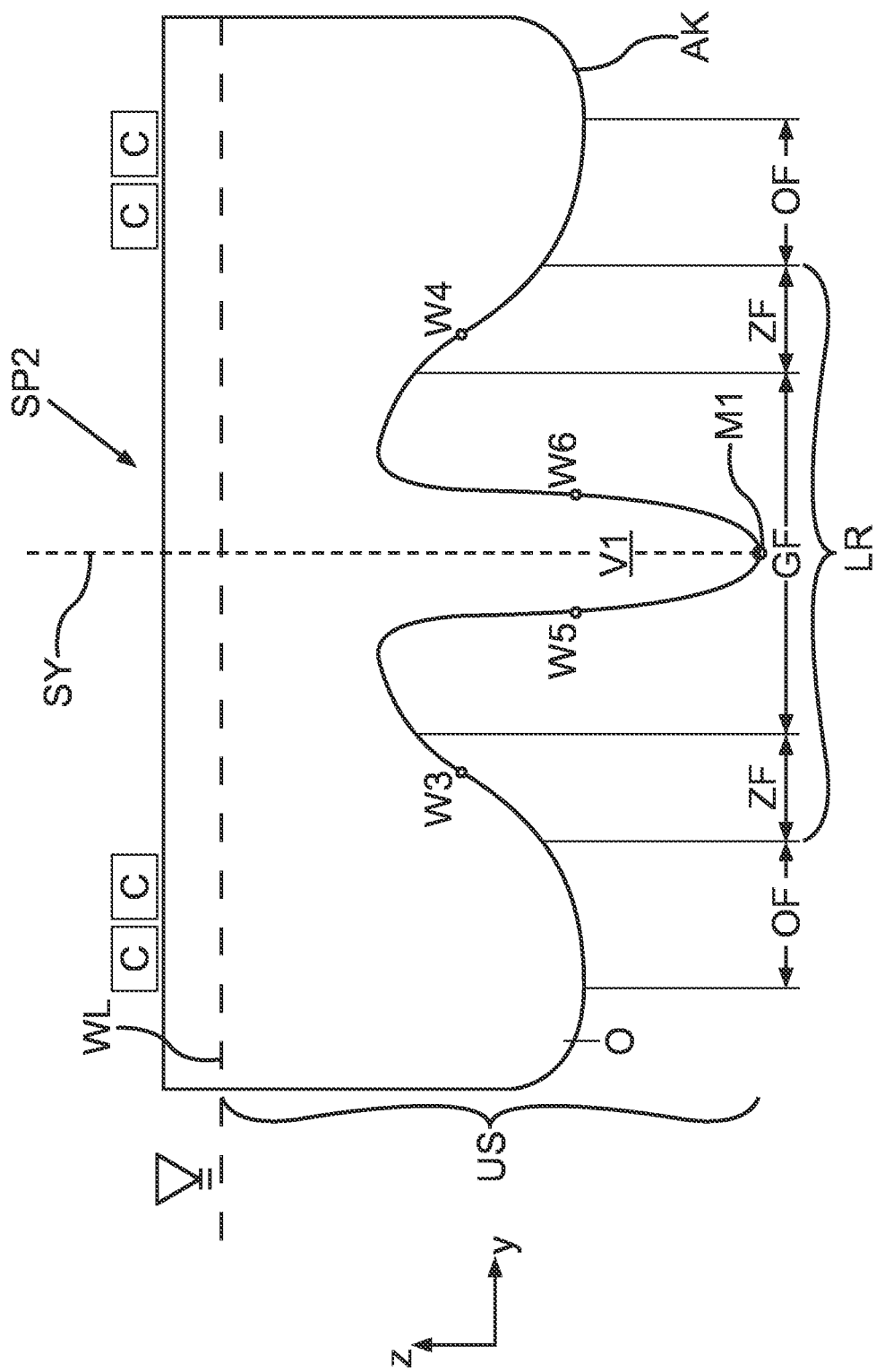
FIG. 3 is a schematic representation of a second body plan with the central elevation including a first depression.

In FIG. 3, the second body plan SP2 is shown. This second body plan SP2 is arranged closer to the stern 16 of the hull 10 than the first body plan SP1. The first body plan SP1 preferably extends through an arcuate segment of the elevation LR. This arcuate segment is well recognizable on the bow side in FIG. 1. The progression of the outer contour AK of the second body plan SP2 first extends similarly as in FIG. 2. First, the outer contour AK extends horizontally along a transverse direction parallel to the y-axis beginning from a start point O. In the further progression, the outer contour AK rises in positive z-direction along the y-axis and reaches a third turning point W3. In this third turning point W3, the slope of the outer contour AK reaches a local maximum. In the further progression of the outer contour in positive y-direction, the slope of the outer contour AK again decreases, reaches the maximum level of the elevation LR and reaches a local minimum in a fifth turning point W5. Therein, the fifth turning point W5 is arranged in the region of a first depression V1.

The first depression V1 is a part of the retaining device 15 for the ship propeller 12. For reasons of clarity, the ship propeller 12 is not illustrated in FIG. 3. The first depression V1 and the outer contour AK associated therewith, respectively, reach a local minimum after the fifth turning point W5 in positive y-direction. This minimum associated with the first depression V1 is denoted by M1 in FIG. 3. This local minimum M1 can also be a global minimum of the outer contour of the second body plan SP2 as represented in FIG. 3. After this minimum M1, the outer contour AK rises in y-direction of the second body plan SP2 and reaches a sixth turning point W6. In this sixth turning point W6, the slope of the outer contour AK reaches a further local maximum. Subsequent to the sixth turning point W6, the slope of the outer contour AK again decreases and leads to the maximum level of the elevation LR. The magnitude of the slope in the third turning point W3 can differ from the magnitude of the slope in the sixth turning point W6.

In the further progression in y-direction, the outer contour AK descends from the horizontal and reaches the fourth turning point W4. The slope of the outer contour AK in the fourth turning point W4 is preferably the same in magnitude as in the third turning point W3. However, the sign of the two slopes is therein opposite. This means that the outer contour has a positive slope in the third turning point W3 and has a slope identical in magnitude, but negative in the fourth turning point W4. Preferably, the second body plan SP2 of the hull 10 is also symmetric with respect to the axis of symmetry SY. In FIG. 2 as well as FIG. 3, an inverted triangle indicates the water line WL.

Figure 4:
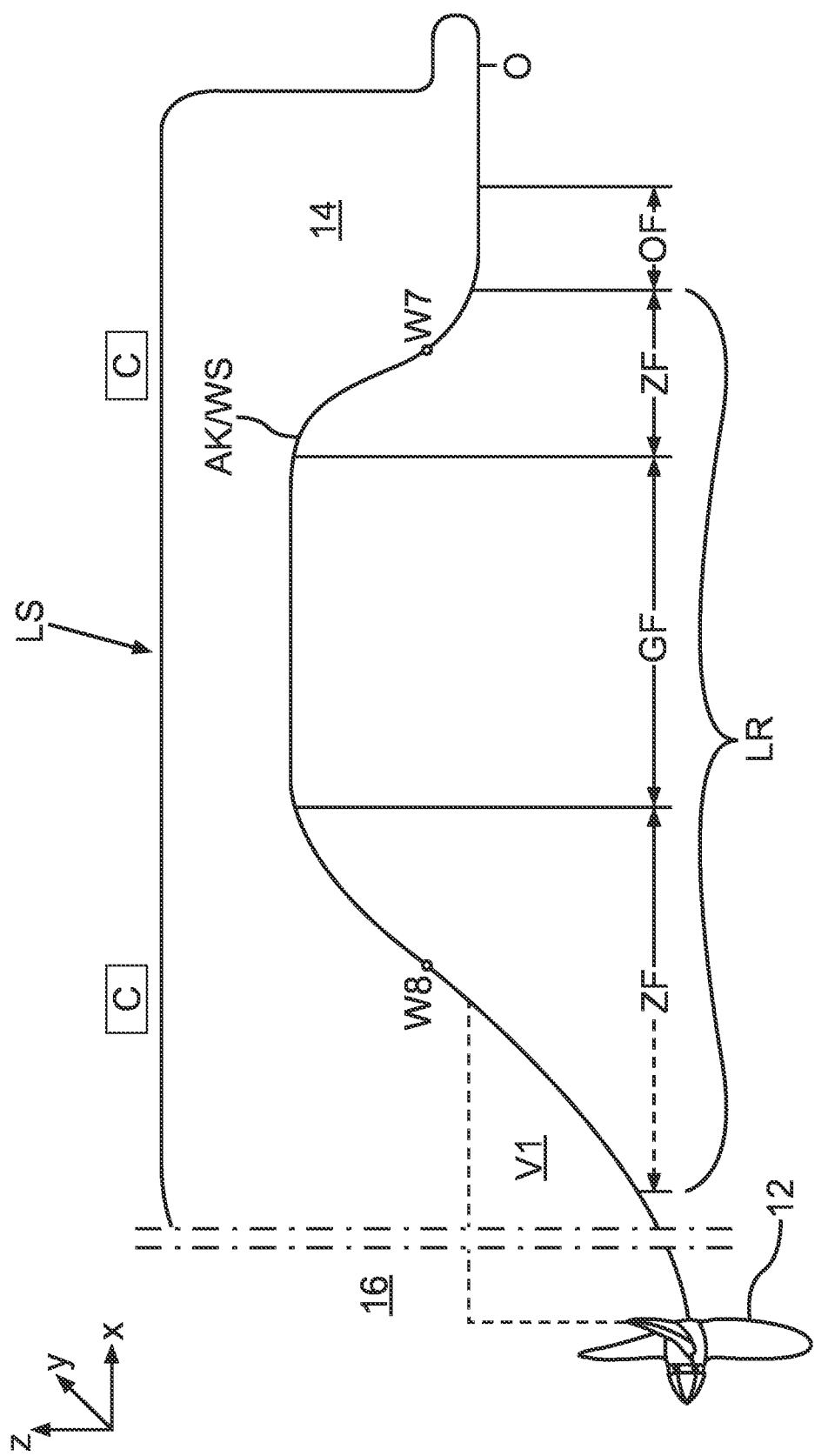
FIG. 4 is a schematic longitudinal section along a preset central line of the hull, wherein the central line intersects the retaining device.

In FIG. 4, a longitudinal section LS is exemplarily shown. Therein, this longitudinal section LS results by sectioning the hull 10 along the outer contour AK, which is associated with a wave cut WS in case of the FIG. In the example of FIG. 4, the bow 14 is arranged on the right side and the region of the stern 16 can be found on the left side. In the region of the bow 14, a protruding nose is indicated at the end of the hull 10. In the region of this protruding nose, the start point O is registered. The progression of the outer contour AK is described in FIG. 4 starting from the start point O in the direction of the stern 16, thus in negative x-direction.

First, the outer contour AK extends horizontally starting from the start point O and reaches the adjoining surface section OF, which is arranged in front of the elevation LR. In the further progression of the outer contour AK in the direction of the stern 16, the outer contour AK first rises and reaches a seventh turning point W7. In this seventh turning point W7, the slope of the outer contour AK reaches a local maximum. In the further progression of the outer contour AK in the direction of the stern 16, the slope of the outer contour AK decreases and reaches the base area GF. The outer contour AK preferably reaches a maximum level in the region of the base area GF. In this region, the vertical position of the elevation is usually maximal. At the stern-side end of the base area GF, the outer contour AK leaves this maximum level and transitions into the intermediate area ZF.

The outer contour AK reaches the region of the first depression V1 over the eighth turning point W8. At the stern-side end of the outer contour AK, the ship propeller 12 is indicated. The ship propeller 12 is preferably connected to a ship's engine via a ship propeller shaft. Usually, the vertical position of the ship propeller 12 is lower than the vertical position of the surface section OF, which adjoins to the intermediate area ZF with the seventh turning point W7 on the bow side. Preferably, the elevation is arranged in a region, which is located between a waist of the hull 10 and the stern 16 of the hull 10. Only for reasons of clarity, the elevation LR is represented larger in the example of FIG. 4. In the example of FIG. 4, the end of the stern 16 is not shown. The longitudinal section LS resembles the example of FIG. 4 at the ship propeller 12. In the further progression in the direction of the stern 16, the hull 10 and the outer contour AK thereof, respectively, would rise upwards. Preferably, the progression of the outer contour AK comprises exactly two turning points starting from the start point O in the direction of the stern 16. These turning points are the seventh turning point W7 as well as the eighth turning point W8 according to FIG. 4. These two turning points characterize the curvature of the intermediate area ZF in the direction of the water line WL.

In contrast to the body plans SP1 and SP2, the longitudinal section LS shown in FIG. 4 is not symmetric. This is already solely due to the fact that the hull 10 does not comprise a ship propeller 12 in the region of the bow 14. In the region of the bow 14, a first depression V1 either cannot be found. The ship propeller 12 as well as the first depression V1 tends to be positioned in the vicinity of the stern 16. However, it also applies to FIG. 4 that the outer contour AK of the hull 10 is continuously differentiable in the longitudinal section LS, at least in the region of the underwater hull US.

Figure 5:
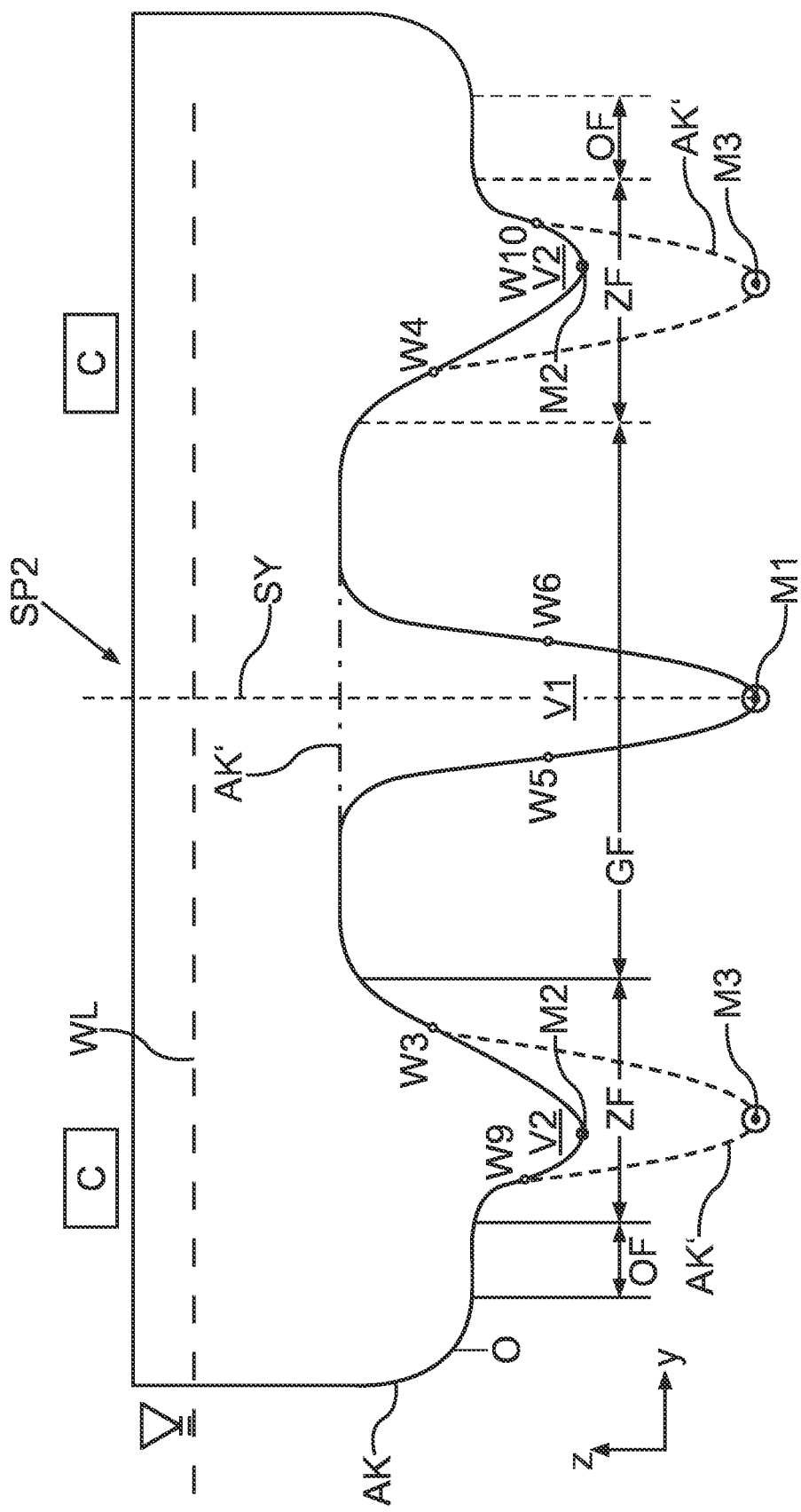
FIG. 5 is a further schematic representation of the second body plan with the first depression and a second depression, which comprises two partial regions.

In FIG. 5, a further second body plan SP2 is shown. In contrast to the second body plan SP2 of FIG. 3, this second body plan SP2 shows a further second depression V2 besides the first depression V1. This second depression V2 splits into two partial regions according to FIG. 5. It is to be noted that the second depression V2 looks two-part only due to the representation in the form of the second body plan SP2. This second depression V2 is arranged laterally of the first depression V1 in transverse direction (y-direction in FIG. 5) of the body plan. Starting from the start point O in FIG. 5 in positive y-direction, the outer contour AK traverses the elevation LR. First, the outer contour AK reaches the adjoining surface section OF. This left-side part of the surface section OF adjoins to the intermediate area ZF. In contrast to the second body plan SP2 of FIG. 3, the intermediate area ZF comprises two turning points in the left region of the elevation LR. In particular, this region, in which the second depression V2 is arranged, can comprise exactly two turning points, namely a ninth turning point W9 as well as the third turning point W3. In FIG. 5, the outer contour AK descends into the second depression V2 over the ninth turning point W9 after leaving the surface section OF. In the second depression V2, a local minimum M2 or a local minimum value is reached or assumed. Due to the symmetric shape of the hull 10 to the axis of symmetry SY, FIG. 5 shows two local minimums M2. In the further progression, the outer contour AK again rises in the direction of the water line WL and reaches the third turning point W3. From the third turning point W3, the outer contour AK transitions into the horizontal base area GF. In the region of the base area GF, the outer contour AK reaches a maximum value or a maximum level. This maximum level can also be referred to as a plateau.

FIG. 5 further shows a dashed outer contour AK'. The dashed outer contour AK' differs from the outer contour AK in the region of the first depression V1 and the second depression V2. In the second depression V2, the outer contour AK' is formed vertically further in negative z-direction in relation to the outer contour AK. In the lowest vertical position of the outer contour AK' of the second depression V2, there is a third minimum M3. This third minimum M3 is preferably positioned on an outer contour of the associated wave cut WS. This in particular means that the position of the ship propeller 12 is reached starting from the third minimum in the direction of the wave cut WS. The outer contour AK' extends horizontally in the region of the axis of symmetry SY in FIG. 4, while the other outer contour AK leads downwards into the first depression V1 with the fifth turning point W5 and the sixth turning point W6. One can say that the outer contour AK' results in a type of U-shape or a downwards open trough in the region from the left intermediate area ZF up to the right intermediate area ZF. The flow of a fluid can be better conducted onto the ship propellers in this region, which can improve the ship drive.

In contrast to the first body plan SP1, the outer contour AK does not directly extend to the fourth turning point W4, but first descends in the direction of the first depression V1. The first depression V1 comprises the fifth as well as the sixth turning point. In the region of the first depression V1, the progression of the outer contour AK again assumes a local minimum. The first depression V1 is associated with the retaining device 15 for the ship propeller 12. The minimum M1 of the first depression V1 is schematically illustrated in FIG. 5 by a small circle. In the further progression of the outer contour AK, it rises and reaches the sixth turning point W6. In the sixth turning point W6, the slope of the outer contour AK locally reaches a maximum value. That is, shortly before the sixth turning point W6 and shortly thereafter, respectively, the magnitude of the slope of the outer contour is not as great as in the sixth turning point W6. The explanations relating to the slope of the outer contour AK in the sixth turning point W6 analogously and correspondingly apply to all of the further turning points.

A turning point is in particular characterized in that the progression of the outer contour AK in the turning point satisfies a mathematic condition. According to the rules of mathematics, the second derivative is zero in a turning point, whereas the third derivative assumes a value unequal to zero. However, in practice, it can be deviated from this criterion insofar as manufacturing tolerances are to be taken into account. This means that it is possible that the progression of the outer contour AK only approximately satisfies the mathematic requirements.

However, the number as well as the positions of the turning points reflect the basic shaping of the hull 10. The second body plan SP2 of FIG. 5 is also formed symmetrically to the axis of symmetry SY. This means that the further progression of the outer contour AK from the local minimum M1 of the first depression V1 in positive y-direction results by corresponding mirroring of the previously applicable progression of the outer contour AK. Accordingly, the outer contour AK reaches the maximum value of the elevation LR between the sixth turning point W6 and the fourth turning point W4. In the fourth turning point W4, the outer contour AK has already left the base area GF and is located in the region of the intermediate area ZF. The outer contour AK transitions into the second depression V2 over the fourth turning point W4. Subsequently, the outer contour AK reaches a minimum value of the second depression V2 (minimum M2) and transitions into the surface section OF adjoining therein over a tenth turning point W10. With the aid of the second depression V2, the elevation LR can be even better delimited from the adjoining surface section OF. A water flow between the first and the second depression can thus be effectively guided in the direction of the ship screw. Due to the second depression V2, stalls SR can additionally be reduced, which can additionally increase the hydrodynamic efficiency of the hull 10 as well as of the container ship.

Figure 6:
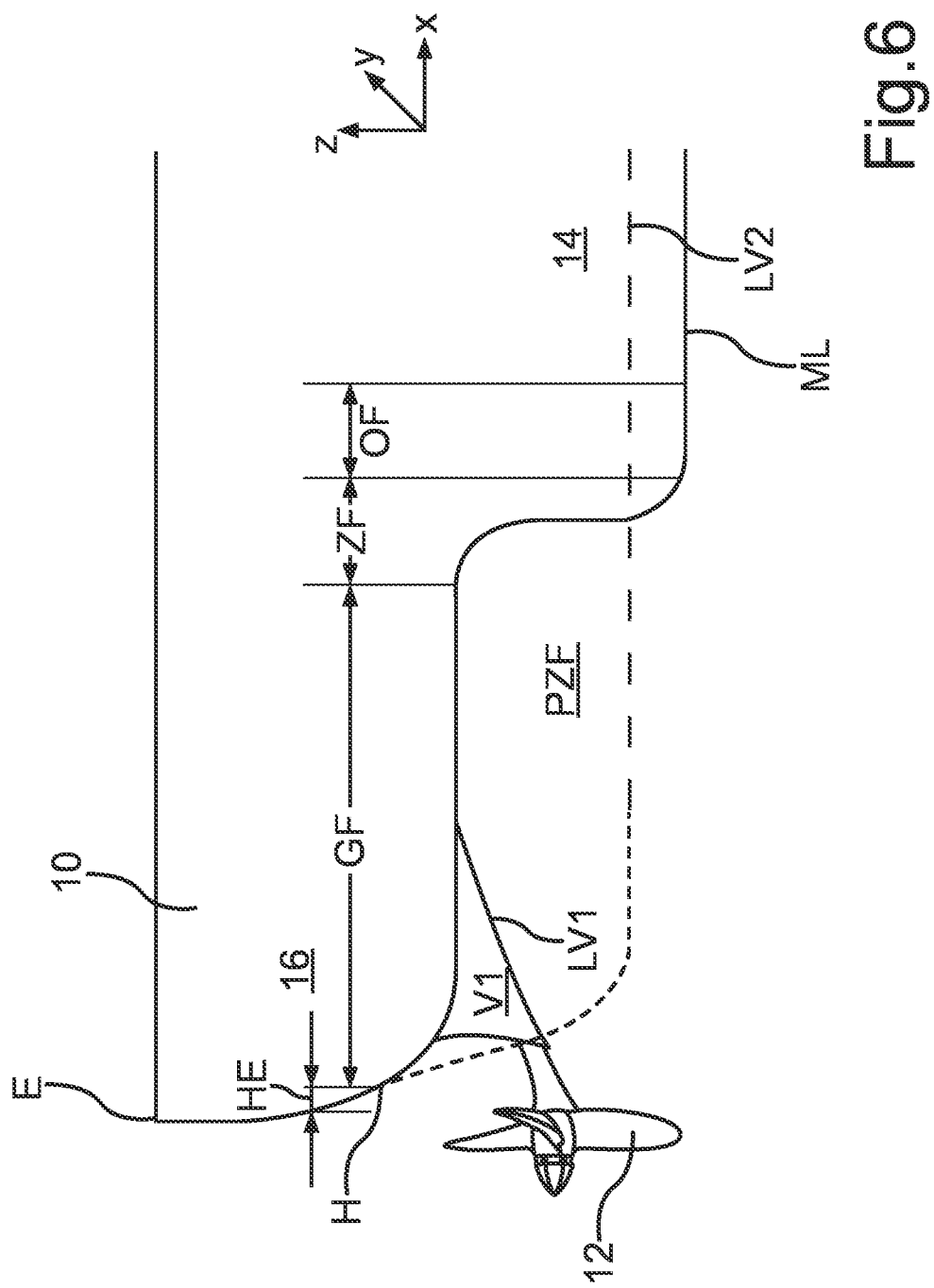
FIG. 6 is an exemplary longitudinal section along the central line, wherein the first depression is schematically illustrated in this longitudinal section.

For better comprehension of the transition of the elevation LR into the stern-side area, FIG. 6 shows a further longitudinal section LS in the region of the stern 16 of the hull 10. FIG. 6 shows the central line ML as well as a bounding line LV2 of the second depression V2. The lines ML as well as LV2 have a different vertical position in the bow-side region of FIG. 6. This is in particular due to the fact that a curvature can be present along the y-direction. The central line ML reaches the adjoining surface section OF coming from the bow 14. In the further progression in the direction of the stern 16, this central line ML descends over the intermediate area ZF and for example leads to the flat base area GF. In the stern-side region of the base area GF, a further bounding line LV1 is registered. This line LV1 represents a bounding line relating to the first depression V1. In the largest part of the elevation LR, the line LV2 first extends horizontally further in the direction of the stern, while the central line ML has already assumed a vertically higher level than the line LV2. Since the bounding Line LV2 is only partially visible, it is represented dashed in FIG. 6.

In the region of the base area GF, the line LV2 has a vertical level different from the central line ML. Due to this difference, the elevation LR arises. The bounding line LV2 more severely rises at the stern-side end of the hull 10 than the central line ML. This means that the vertical level of the line LV2 approaches the vertical level of the central line ML in the direction of the stern 16 and finally adapts to it. In FIG. 6, a region PZF is also drawn. This region represents a vertically projected intermediate area. One clearly and explicitly recognizes that this projected intermediate area PZF tapers on the stern side and the corresponding bounding lines ML as well as LV2 converge.

From a point H, the vertical positions of the elevation as well as of the second depression V2 have adapted. From this point H in the direction of the stern 16, only one common stern-side area exists. This point H is arranged close to the stern-side end of the hull 10. A stern-side end of the hull 10 is denoted by the point E. From it, a longitudinal distance of the two points H and E can be formed. This distance HE can for example be maximally 5% of the entire longitudinal extension of the hull 10. In particular, this distance HE can also be less than 5% of the entire longitudinal extension of the hull 10. Thus, it is also possible that the distance HE is less than 1% of the length of the hull 10.

The FIGS. 1 to 9 are to be helpful in making the hull 10 better comprehensible. These figures are not to scale and only serve for qualitatively describing a shaping of the elevation as well as the shape of the hull 10. Specific numerical values relating to the dimensions or slopes of the outer contour AK cannot be derived from the FIGS. 1 to 9, which are to be regarded as obligatory features for the hull 10. In particular, it can be provided that further turning points are not arranged in the progression of the outer contour AK on the bottom side of the underwater hull US besides the turning points shown in FIGS. 1 to 6.

Figure 7:
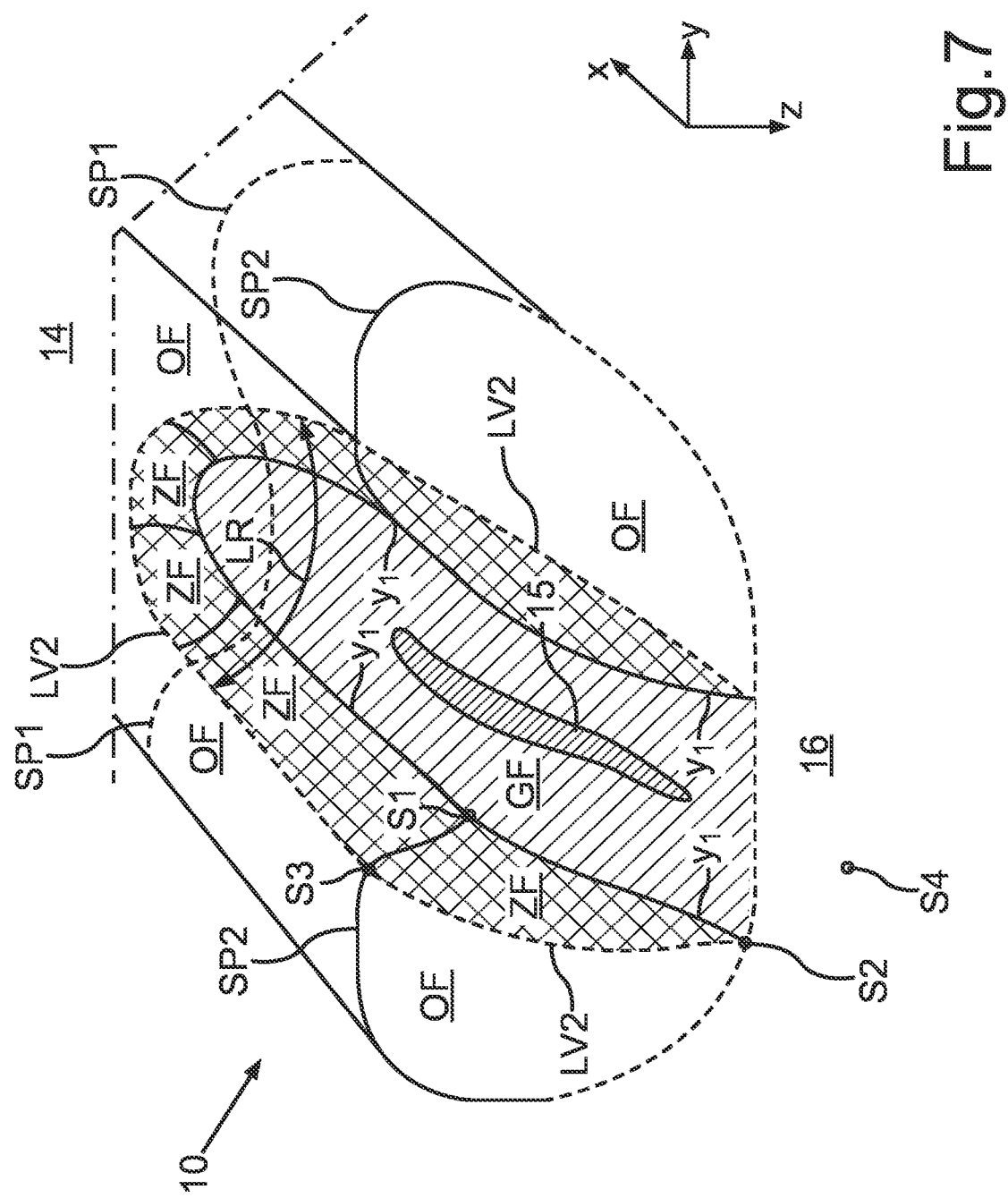
FIG. 7 is a schematic view to a part of the hull with the elevation.

FIG. 7 shows a schematic view to a part of the hull 10, which includes the elevation LR. The bow-side region of the hull 10 is not illustrated in FIG. 7. In FIG. 7, it is to be noted that the hull 10 is shown rotated by 180 degrees. The z-direction points downwards in the case of FIG. 7. In positive x-direction, the hull 10 would continue to the bow 14. The elevation LR can be surrounded by the adjoining surface section OF. However, this does not completely apply because the surface section OF only partially surrounds the elevation LR. As is seen in FIG. 7, the adjoining surface section OF does not enclose the elevation LR in negative x-direction. In the example of FIG. 7, the elevation LR breaks down into the intermediate area ZF and the base area GF. For reasons of clarity, the otherwise arranged retaining device 15 is not shown in FIG. 7. Instead, only a hatched area is shown in the region of the base area GF. In the region of this hatched area, the retaining device 15 with the ship propeller 12 would normally be arranged. As is clearly apparent in FIG. 7, the elevation LR does not terminate in negative x-direction in the direction of the stern 16. Rather, the elevation LR is formed open in negative x-direction.

This is also clearly apparent on the progression of the intermediate area ZF in negative x-direction. In the direction of the bow 14, the intermediate area ZF bends in positive and negative y-direction to the central line ML, respectively. Thereby, the intermediate area ZF as well as the associated base area GF forms an arcuate shape in the bow-side region of the elevation LR. In FIG. 7, the progression of the outer contour AK of the first body plan SP1 is schematically shown. The outer contour AK of the first body plan SP1 divides the elevation into two regions. A first region is arranged in positive x-direction, a second region is arranged in negative x-direction. In the first region, the intermediate area ZF curves such that the base area GF is transferred into the adjoining surface section OF. At the same time, the intermediate area ZF curves in negative and positive y-direction, respectively, such that the first region of the elevation LR is arcuately configured. This first region of the elevation LR can also assume the shape of a circular segment, an ellipse and/or a parabola.

The second region of the elevation LR starting from the outer contour AK of the first body plan SP1 in the direction of the stern 16 first extends similar to a rectangle. In this region, a bounding line y1 is exemplarily drawn. This bounding line y1 delimits the base area GF from the intermediate area ZF. This bounding line y1 forms two lines between the first and the second body plan, which can extend parallel or diverge in the direction of the stern 16.

In the second region of the elevation LR, the outer contour AK of the second body plan SP2 is schematically registered. The bounding line y1 as well as the outer contour AK of the second body plan SP2 intersect each other at a point S1. Starting from this point S1 along the bounding line y1 in the direction of the stern 16, the bounding line y1 rises. The bounding line LV2 of the surface section OF intersects the outer contour AK of the second body plan SP2 at a point S3. FIG. 7 clearly shows how the bounding line y1 as well as the bounding line LV2 converge at a point S2 starting from the points S1 and S3, this means that the adjoining surface section OF vertically approaches the base area GF in the direction of the stern 16.

The vertical height of the point S1 differs from the vertical height of the point S3. If one would shift the outer contour AK of the second body plan SP2 parallel in negative x-direction, thus, the difference of the vertical positions of the corresponding points would correspondingly decease. If one views the intermediate area ZF in the region of the points S1, S2 and S3, thus, one ascertains that the bounding lines of the intermediate area ZF converge at the point S2 in this region. In the example of FIG. 7, the adjoining surface section OF rises more severely in the direction of the stern 16 than the base area GF of the elevation LR. This results in the fact that the adjoining surface section OF transitions into the elevation LR and into the base area GF of the elevation LR, respectively. This results in the rearwards open shape of the elevation LR shown in FIG. 7. Starting from the point S2 in negative x-direction, the common stern-side area adjoins. In this area, it can no longer be differentiated between the individual area constituents OF, ZF and GF.

One point S4 is exemplarily shown in the region of this stern-side area. This point S2 can be associated neither with the intermediate area ZF nor with the adjoining surface section OF. The area in the region of the point S4 can be curved, but does no longer comprise an elevation LR as illustrated in FIG. 7. It is to be noted that the stern-side area rises in the direction of the water line in the further progression in the direction of the negative x-direction. The surface section OF, the intermediate area ZF as well as the base area GF transition into the stern-side area at the point S2. However, this transition is usually not abruptly realized at a point as shown in FIG. 7, but these areas mostly smoothly transition into the stern-side area. Therein, the stern-side area, which adjoins to the intermediate area ZF, the adjoining surface section OF and/or the base area GF in negative x-direction, usually corresponds to the surface of a hull 10 as it is already known.

Figure 8:
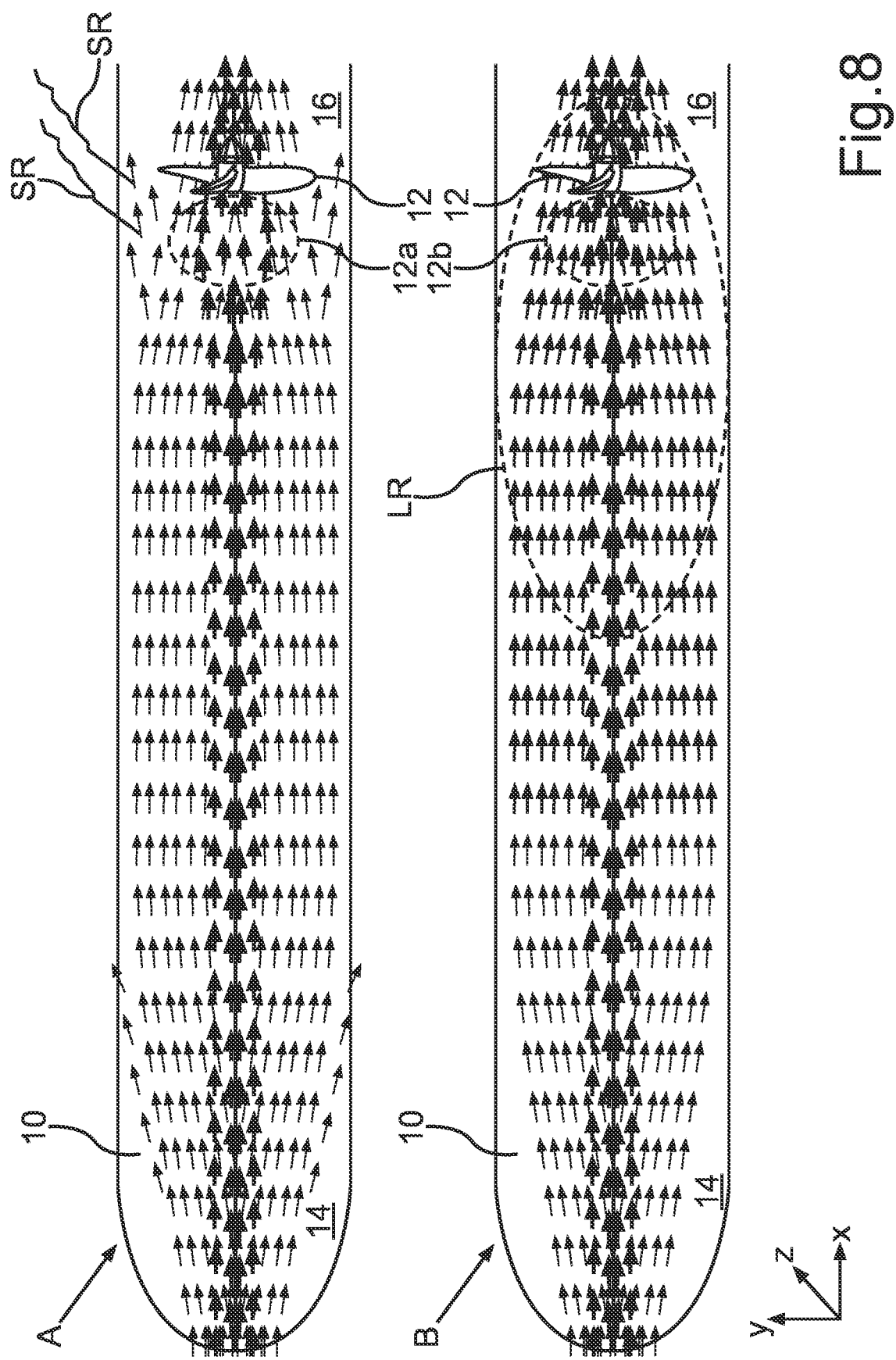
FIG. 8 is a schematic flow profile in vertical viewing direction to the hull.

FIG. 8 schematically shows two different variants of hulls A as well as B. Therein, the variant A corresponds to a usual hull 10, the variant B corresponds to a hull 10, which comprises the elevation LR. The arrows in FIG. 8 are to schematically show a progression of the water flow. However, it is to be noted that the illustrated flow is only schematically shown in FIG. 8. FIG. 8 is to clarify, which technical effect the hull 10 with the elevation LR, thus the variant B, has in relation to a usual hull 10 of the variant A. The variant A as well as the variant B constructionally differs in the example of FIG. 8 exclusively by the elevation LR. This results in the fact that the flow profile of the two variants A and B is different.

The region of the elevation LR is indicated by an ellipse in the variant B. Already before the elevation LR, a higher fluid speed is apparent in variant B. This is indicated in FIG. 8 by slightly thicker arrows in the variant B compared to the variant A. In the region of the elevation, a higher fluid speed is also apparent. This is in particular due to an improved water guidance or incident flow of the ship propeller. Therein, the region around the ship propeller 12 is of particular interest. This region is denoted by the reference character 12a for the variant A and 12b for the variant B, respectively, in FIG. 8. In variant A, it is apparent that the water flow partially flows to the side from the region of the ship propeller and flows out of the hull 10. This "outflow" is also apparent in the region of the bow 14 in variant A. This results in the fact that a higher water volume flow tends to flow past the ship propeller 12 in the variant A. In contrast thereto, the water flow in the variant B is indicated slightly more severely compacted in the region 12b than in case of the variant A. This means that at least a part of the water flow is more effectively and better focused to the ship propeller 12 by the elevation LR. Thus, the water flow below the hull 10 can be additionally used for a drive of the container ship or any other ship or boat.

In the variant A, a stall SR is schematically drawn. Thereby, it is to be indicated that a part of the water flow detaches out of the region of the hull 10 and laterally drifts away in the variant A. Such a water flow can increase the hydrodynamic resistance and additionally is no longer usable for the ship propeller 12. In addition, more hydrodynamic turbulences can arise in the variant A. By the illustrated shaping of the elevation LR, the water flow below the hull 10 is better and more specifically directed onto the ship screw. Therefore, in the region 12b of the variant B, a compacted flow is apparent. Therein, the term "compacted flow" does not mean that the water has a higher density there. Rather, it is to be expressed thereby that the water flow can have a higher flow rate in this region. In addition, the presented hull 10 can reduce the turbulences compared to variant A. The effect of the variant B with the elevation LR can also be described by that similar to a funnel even if this representation is simplified. The water flow is continuously focused or concentrated to a region around the ship propeller 12.

Figure 9:
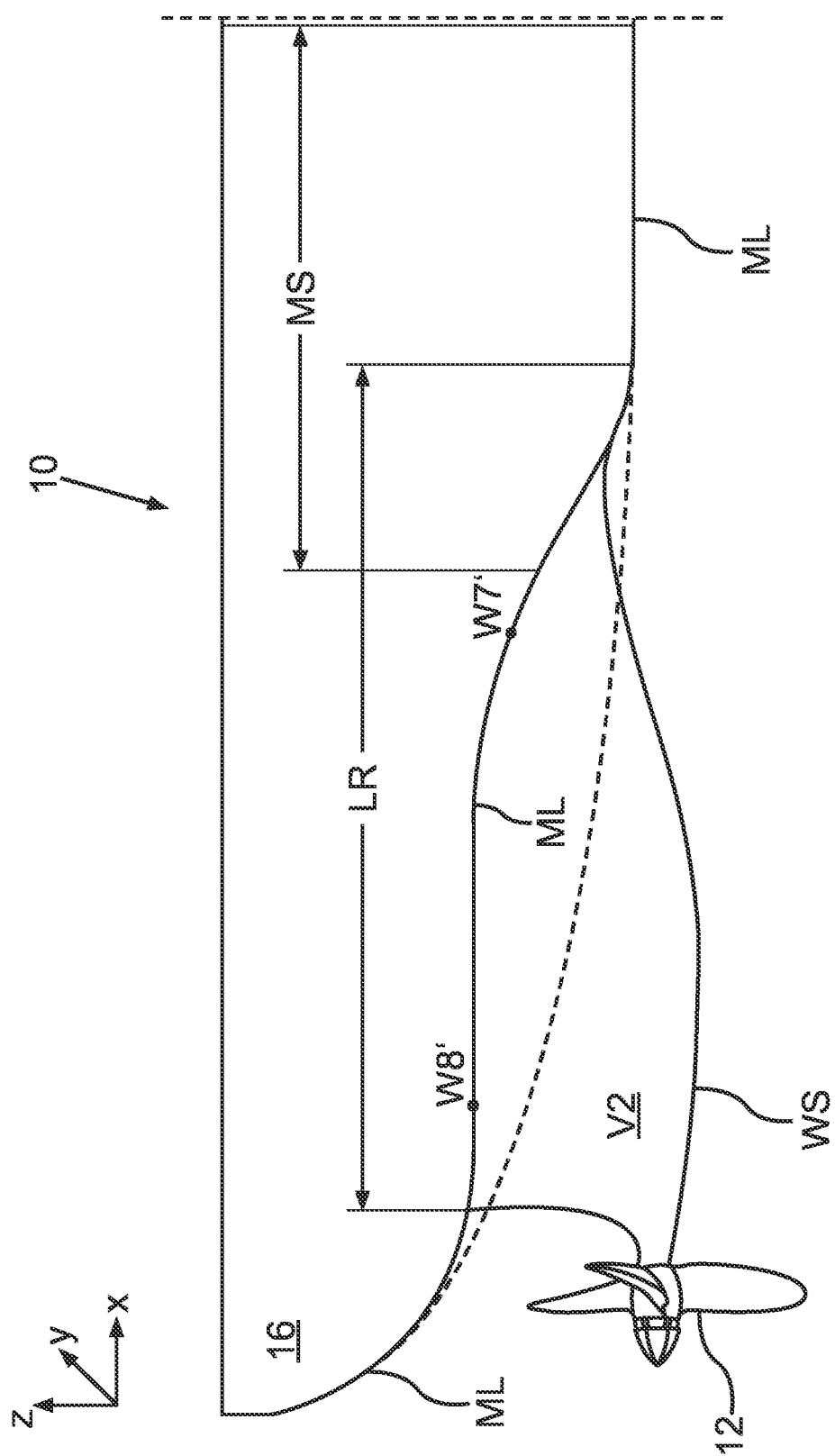
FIG. 9 is a schematic representation of the hull in a longitudinal section with the second depression as the retaining device for the ship propeller.

FIG. 9 shows a schematic representation of the hull 10 in the longitudinal section LS with the second depression V2 as a retaining device 15 for the ship propeller 12. FIG. 9 in particular shows a possible embodiment according to claim 2. In relation to the stern 16, a region of the waist MS is indicated. The region of the waist MS can be understood as a middle region of the hull 10, which includes the middle. FIG. 9 schematically shows a section along the central line ML as well as along the wave cut WS. The line of the wave cut WS has a different position in relation to the central line ML with respect to the y-direction or y-coordinate. A further seventh turning point W7' and a further eighth turning point W8' are shown along the central line ML. These two turning points are in the region of the elevation LR. Starting from the further eighth turning point W8', the central line ML leads into the stern 16 of the hull 10. On the bottom side of the hull 10, a dashed line is registered, which extends farther below compared to the central line. This dashed line indicates how the hull 10 would extend in a usual container ship. In relation to this dashed line, the progression of the elevation LR is clearly apparent.

Coming from the region of the waist MS, a line of the wave cut MS descending downwards is shown. This line associated with the wave cut WS can be attributed to the second depression V2, which is located laterally of the central line. Along this line associated with the wave cut WS, one arrives at the ship propeller 12 in negative x-direction. The second depression V2 shown in FIG. 9 is mostly two-times present. A second depression V2 is mostly arranged on the left, for example in positive y-direction. A further additional second depression V2 is often arranged on the right, thus in relation to the left second depression V2. Preferably, according to the example of FIG. 9, an even number of second depressions V2 as well as an even number of ship propellers always results.

The results shown in FIG. 8 are a result of a CFD simulation. The result of these simulations could also be qualitatively evidenced in experimental trials. A hull 10 with the elevation LR, thus the variant B, optimizes the water flow in the region of the ship screw. Thereby, the water flow surrounding the ship screw can be better and more efficiently utilized for the ship drive. Moreover, the hull 10 according to the variant B can considerably reduce hydrodynamic resistances.

What is claimed is:

1. A hull for a ship comprising:
an elevation of an outer contour of the hull with respect to an upwards directed vertical direction of the hull in a region of a first body plan and a second body plan in relation to a surface section immediately adjoining to the elevation,
wherein the elevation is arranged in a region between a middle and a stern of the hull and the elevation is located on a bottom side of the hull,
wherein the outer contour in the first body plan, which extends in a bow-side region of the elevation, comprises a first inflection point and a second inflection point and the outer contour in the first body plan reaches a maximum value with respect to the vertical direction in a region of a center of the elevation,
wherein the outer contour in the second body plan, which is located closer to the stern of the hull in relation to the first body plan, comprises a first depression with a third inflection point and a fourth inflection point centrally in the elevation, wherein the first depression is a part of a retaining device for a ship propeller shaft for receiving a ship propeller,
wherein the outer contour in the second body plan comprises a fifth inflection point and a sixth inflection point, wherein the third inflection point is located farther outwards with respect to the first depression transversely to the hull in relation to the fifth inflection point and the fourth inflection point is located farther outwards with respect to the first depression transversely to the hull in relation to the sixth inflection point,
wherein the outer contour comprises a seventh inflection point in a longitudinal section of the hull along a preset central line of the elevation in the bow-side region of the elevation and transitions from the elevation into the first depression over an eighth inflection point on a stern-side end of the elevation, and
wherein a vertical position of the elevation adapts to a vertical position of the surface section adjoining thereto at the stern-side end of the elevation along the longitudinal section in the direction of the stern.

2. The hull according to claim 1, wherein a longitudinal extension of the elevation, a transverse extension of the elevation and/or a vertical extension of the elevation are set depending on a preset function with a load requirement.

3. The hull according to claim 2 with a ship propeller, wherein the transverse extension of the elevation perpendicular to a longitudinal direction of the hull is set depending on a width of the ship propeller, wherein the transverse extension of the elevation is maximally ⅓ of a width of the hull.

4. The hull according to claim 3, wherein the transverse extension of the elevation assumes a value between 80% and 150% of the width of the ship propeller.

5. The hull according to claim 3, wherein the transverse extension of the elevation is larger by 15% to 25% than the width of the ship propeller.

6. The hull according to claim 1, wherein the elevation rises in the direction of a preset water line towards the stern.

7. The hull according to claim 1, wherein the elevation comprises a base area and a part of the base area, which faces the bow-side region, is formed as an elliptical segment, parabolic segment and/or circular segment.

8. The hull according to claim 7, wherein two bounding lines of the base area of the elevation always have an identical distance to each other in a longitudinal direction at least in a stern-side half of the elevation.

9. The hull according to claim 7, wherein the elevation comprises an intermediate area immediately adjoining to the surface section and a projection of the intermediate area to a vertical area perpendicular to the vertical direction and/or parallel to a transverse direction tapers on the stern-side end such that the elevation and an adjoining surface section transition into each other into a common stern-side area of the hull in a longitudinal direction of the hull to the stern.

10. The hull according to claim 9, wherein the base area and/or the intermediate area comprise a curvature in the direction of a preset water line.

11. The hull according to claim 10, wherein the outer contour in the first body plan transitions from the adjoining surface section into the curved intermediate area with the first inflection point in the bow-side region of the elevation along a preset transverse direction of the hull, the outer contour subsequently transitions into the base area, the outer contour again transitions into the curved intermediate area with the second inflection point after the base area, wherein a third mathematic derivative of a progression of the outer contour of the first body plan in the first inflection point has a sign different from the second inflection point and the outer contour does not comprise further inflection points.

12. The hull according to claim 9, wherein a vertical position of the stern-side area adapts to the vertical position of the elevation at the stern-side end of the elevation along the longitudinal section in the direction of the stern.

13. The hull according to claim 1, wherein the outer contour in the first body plan and/or the outer contour in the second body plan comprise a second depression with a ninth inflection point and a tenth inflection point on both sides of the elevation along a transverse direction of the hull.

14. A hull for a ship comprising:
an elevation of an outer contour of the hull with respect to an upwards directed vertical direction of the hull in a region of a first body plan and a second body plan in relation to a surface section immediately adjoining to the elevation,
wherein the elevation is arranged in a region between a middle and a stern of the hull and the elevation is located on a bottom side of the hull,
wherein the outer contour in the first body plan, which extends in a bow-side region of the elevation, comprises a first inflection point and a second inflection point and the outer contour in the first body plan reaches a maximum value with respect to the vertical direction in a region of a center of the elevation,
wherein the outer contour in the second body plan is located closer to the stern of the hull in relation to the first body plan,
wherein the outer contour in the second body plan, on each side of the elevation, comprises a second depression with a ninth inflection point and a tenth inflection point along a transverse direction of the hull, wherein each second depression is a part of a retaining device for a ship propeller shaft for receiving a respective ship propeller,
wherein the outer contour in the second body plan reaches a further maximum value with respect to the vertical direction in the region of the center of the elevation,
wherein the outer contour comprises a seventh inflection point in a longitudinal section of the hull along a preset central line of the elevation in the bow-side region of the elevation and transitions from the elevation into a stern-side section of the hull over an eighth inflection point on a stern-side end of the elevation, and
wherein a vertical position of the elevation adapts to a vertical position of the surface section adjoining thereto at the stern-side end of the elevation along the longitudinal section in the direction of the stern.

15. The hull according to claim 14, wherein a longitudinal extension of the elevation, a transverse extension of the elevation and/or a vertical extension of the elevation are set depending on a preset function with a load requirement.

16. The hull according to claim 14, wherein the elevation rises in the direction of a preset water line towards the stern.

17. The hull according to claim 14, wherein the elevation comprises a base area and a part of the base area, which faces the bow-side region, is formed as an elliptical segment, parabolic segment and/or circular segment.

18. The hull according to claim 17, wherein two bounding lines of the base area of the elevation always have an identical distance to each other in a longitudinal direction at least in a stern-side half of the elevation.

* * * * *